United States Patent [19]

Inoue

[11] 4,397,506
[45] Aug. 9, 1983

[54] DECELERATION SENSING VALVE ASSEMBLY FOR VEHICLE BRAKE

[75] Inventor: Hidefumi Inoue, Omiya, Japan

[73] Assignee: Jidosha Kiki Co., Ltd., Tokyo, Japan

[21] Appl. No.: 234,122

[22] Filed: Feb. 13, 1981

[30] Foreign Application Priority Data

Feb. 13, 1980 [JP] Japan .................. 55-16210

[51] Int. Cl.³ .............................. B60T 8/14
[52] U.S. Cl. .................. 303/24 C; 188/349; 303/6 C; 303/24 F
[58] Field of Search ............. 303/24 R, 6 C, 24 A, 303/6 R, 24 C, 24 F, 24 BB, 84 A, 84 R, 23 A, 23 R, 22 A, 22 R; 188/349, 195; 137/38, 39, 45, 46

[56] References Cited

U.S. PATENT DOCUMENTS

| 2,030,288 | 2/1936 | Freeman ................... 303/24 F |
| 3,944,293 | 3/1976 | Ishigami et al. ........... 303/24 F |
| 4,131,326 | 12/1978 | Takayama et al. ........ 303/24 R X |
| 4,141,596 | 2/1979 | Takeshita et al. ......... 303/24 C |

FOREIGN PATENT DOCUMENTS 2069643  8/1981  United Kingdom .............. 303/24 F Primary Examiner—Douglas C. Butler
Attorney, Agent, or Firm—Flynn, Thiel, Boutell & Tanis

[57] ABSTRACT

A deceleration sensing valve is provided which includes a valve body adapted to move under its own inertia as the deceleration of a road vehicle exceeds a given value, and a valve seat on which the valve body seats. The valve seat is located rearwardly of the valve body as viewed in the direction of movement thereof under its inertia, whereby there can occur no change in a control pressure derived by the deceleration sensing valve, in particular when the vehicle is empty, as it does occur in the prior art in response to any slight shift in the timing when the valve body becomes seated. Consequently, when used in combination with a proportion valve, the deceleration sensing valve of the invention assures a stable braking characteristic when the vehicle is empty as well as when the vehicle is occupied.

11 Claims, 7 Drawing Figures

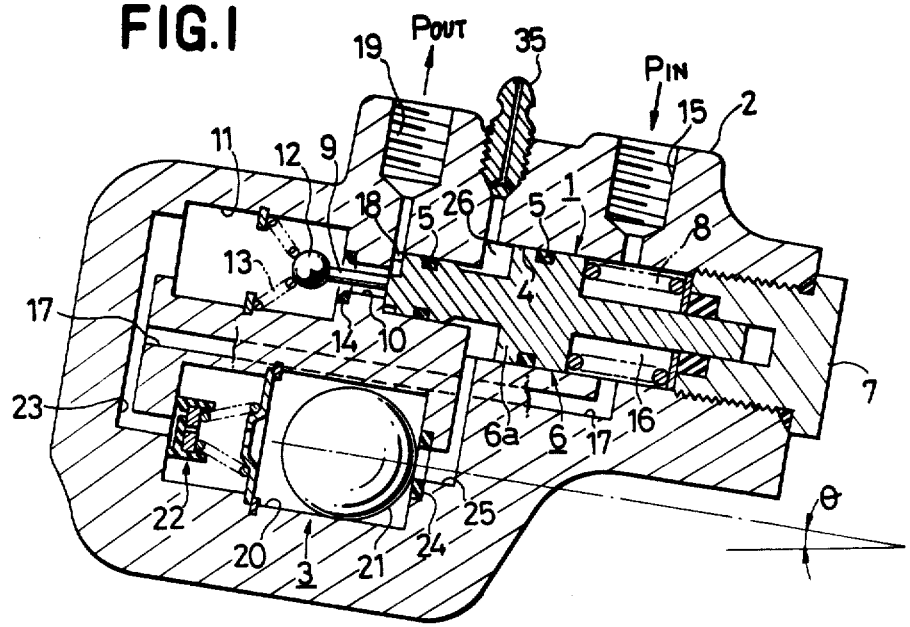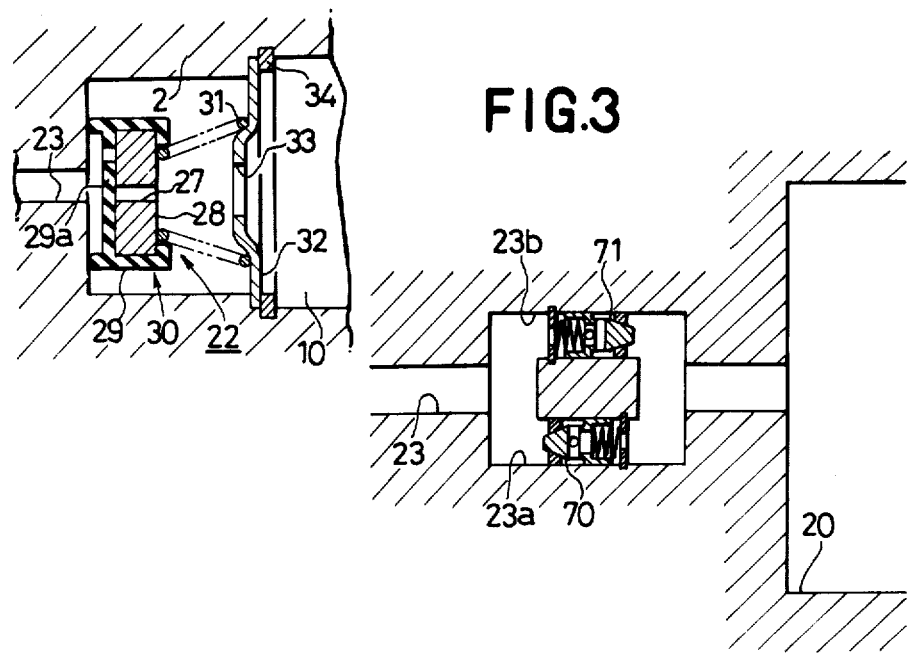

DECELERATION SENSING VALVE ASSEMBLY FOR VEHICLE BRAKE

BACKGROUND OF THE INVENTION

The invention relates to a deceleration sensing valve assembly which operates by sensing the deceleration of a vehicle, and more particularly, to a deceleration sensing valve assembly including a valve body which is adapted to move away from its valve seat under its own inertia whenever the deceleration of the vehicle exceeds a given value.

In conventional deceleration sensing valves, a valve seat is located forwardly of a valve body, as viewed in the direction of movement of the valve body under its inertia. When a given deceleration is obtained by a low liquid brake pressure as when the vehicle is empty, the valve body is caused to move into seating on the valve seat under its inertia, thereby interrupting a flow path to maintain the liquid brake pressure which is introduced to a point downstream of the deceleration sensing valve at a low value. On the other hand, when a given deceleration is not obtained if the liquid brake pressure increases to a high value as when the vehicle is occupied, the valve body is located remote from the valve seat under gravity, permitting the high liquid brake pressure to be introduced into the flow path downstream of the deceleration sensing valve. A deceleration sensing valve of the kind described is used in combination with a proportioning valve which increases the liquid brake pressure introduced into a rear wheel cylinder at a low increase rate relative to the liquid brake pressure introduced into a front wheel cylinder, and normally controls the magnitude of a bias applied to the proportioning valve in accordance with the magnitude of the liquid brake pressure introduced into the flow path downstream of the deceleration sensing valve, in a manner such that the bias in maintained low to enable the proportioning valve to be responsive to a low liquid brake pressure when the vehicle is empty while the bias is increased to enable the proportioning valve to be operable only after a high liquid brake pressure is obtained when the vehicle is occupied, thus assuring braking characteristics which are suitable when the vehicle is empty and loaded, respectively.

However, because of the location of the valve seat forwardly of the valve body as viewed in the direction of movement thereof under inertia and the arrangement that the valve body moves under inertia until it seats on the valve seat, conventional deceleration sensing valves suffer from a disadvantage that in particular when the vehicle is empty, extraneous factors such as oscillations of the vehicle may cause a shift in the timing when the valve body becomes seated. This in turn causes a variation in the liquid brake pressure which is confined in the flow path downstream of the deceleration sensing valve, thus making the empty vehicle characteristic unstable.

SUMMARY OF THE INVENTION

It is an object of the invention to provide a deceleration sensing valve assembly which is capable of stabilizing an empty vehicle braking characteristic. This object is achieved by locating a valve seat rearwardly of a valve body so that the valve body moves away from the valve seat under its own inertia whenever the deceleration of a vehicle exceeds a given value.

Other objects and advantages of the invention will become apparent from the following description with reference to the drawings.

BRIEF DESCRIPTION OF THE DRAWINGS

FIG. 1 is a longitudinal section of a deceleration sensing valve according to one embodiment of the invention which is combined with a proportioning valve;

FIG. 2 is a fragmentary enlarged view of FIG. 1;

FIG. 3 is a longitudinal section of a valve mechanism according to another embodiment;

DESCRIPTION OF EMBODIMENTS

Figure 4:
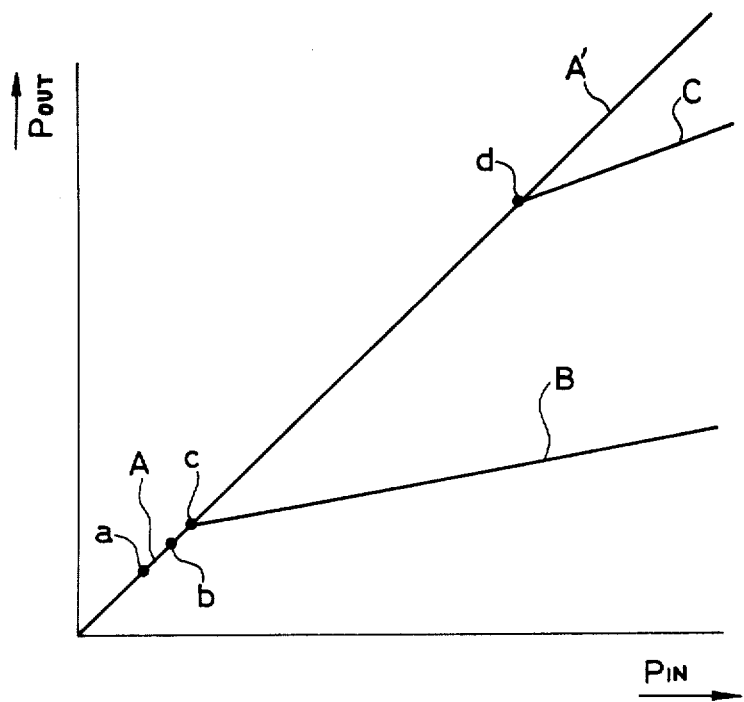
FIG. 4 graphically illustrates the braking characteristic.

Referring to FIG. 1, there is shown a control valve assembly having a proportioning valve 1 disposed in a casing 2, in which a deceleration sensing valve 3 according to the invention is also disposed. The casing 2 is formed with a bore 4 in which a plunger 6 of the proportioning valve 1 is slidably fitted in liquid tight manner by means of a seal member 5. The plunger 6 is urged to the left by a spring 8 which is interposed between the right-hand end face of a portion 6a of the plunger having an increased diameter which is formed intermediate its ends and the left-hand end face of a plug 7 which blocks the right-hand opening of the bore 4. The left-hand end of the plunger 6 is provided with a rod 9, which loosely extends through an opening 10 into a chamber 11 whenever the plunger 6 is urged to the left by the spring 8 to assume its non-operative position shown in FIG. 1, the opening 10 communicating with the bore 4. Received with the chamber 11 is a valve body 12 which is adapted to be subject to a thrust from the rod 9 and which is urged by a spring 13 in a direction to seat on a valve seat 14 which is formed around the opening 10. However, it is to be noted that the resilience of the spring 8 is greater than that of the spring 13, so that the plunger 6 is normally maintained in its non-operative position shown, with the valve body 12 being held apart from the valve seat 14 by means of the rod 9.

The casing 2 is formed with an input port 15 which is connected to a master cylinder, not shown, and which also communicates with a chamber 16 in which the spring 8 is received. The chamber 16 communicates with the chamber 11 which contains the valve body 12 through a passage 17 which is formed to extend through the casing 2. The casing is also formed with an output port 19 which is connected to a rear wheel cylinder, not shown. The chamber 16 also communicates with the output port 19 through the opening 10 and through a passage 18 which is defined around the step between the plunger 6 and the rod 9.

The deceleration sensing valve 3 includes a chamber 20 and a ball-shaped valve body 21 which is received therein in a freely rollable manner. It is to be noted that by mounting the casing 2 on the vehicle chassis, not shown, with an angle of inclination, $\theta$, the valve body 21 normally assumes its downmost position within the chamber 20. The uppermost portion of the chamber 20 which contains the valve body 21 communicates with the chamber 11 containing the valve body 12 of the proportioning valve 1 through a valve mechanism 22 and passages 23, 17. On the other hand, the downmost portion of the chamber 20 communicates with a chamber 26 which is formed in the left end portion of the plunger portion 6a having an increased diameter, through a valve seat 24 on which the valve body 21 seats by gravity and through another passage 25.

As shown in exaggerated form in FIG. 2, the valve mechanism 22 includes a disc-shaped member 28 which is centrally formed with a through-opening 27 in substantial alignment with the axis thereof, and an elastic member 29 formed of a material such as rubber and which is disposed to surround the periphery of the member 28 and having a flexible portion 29a located adjacent to the passage 23 and adapted to block the through-opening 27 under its own resilience. The combination of the disc-shaped member 28 and the elastic member 29 constitutes together a valve body 30. The valve body 30 is biased in one direction by a spring 31 so as to close normally the passage 23. Accordingly, the valve mechanism 22 becomes open whenever a liquid brake pressure prevailing within the chamber 11 exceeds a given value to allow the brake pressure to be introduced into the chamber 20. Subsequently, when the brake pressure within the chamber 11 decreases, the hydraulic fluid introduced into the chamber 20 is displaced toward the chamber 11 through the opening 27 and a clearance formed between the disc-shaped member 28 and the flexible portion 29a which is then flexed under the pressure thereof.

As illustrated in FIG. 3, a valve mechanism having the same function can be formed by providing a pair of parallel branch paths 23a, 23b in the passage 23, with a check valve 70 or 71 disposed in each branch path to permit a flow in the opposite direction from the other. It will be understood that the check valve 71 corresponds to the flexible portion 29a mentioned above.

A reference numeral 32 shown in FIG. 2 represents a retainer functioning as an abutment for the spring 31, numeral 33 an opening formed in a shank portion of the retainer, and numeral 34 a stop ring which supports the retainer. In FIG. 1, reference numeral 35 represents an air vent valve.

In operation, when a brake pedal, not shown, is depressed to produce a liquid brake pressure within the master cylinder, the brake pressure is transmitted through the input port 15 to the output port 19 through a path including the chamber 16, passage 17, chamber 11, opening 10 and passage 18, allowing the pressure to be introduced into the rear wheel cylinder. During an initial phase of a braking operation when the liquid brake pressure is low, the plunger 6 of the proportioning valve 1 is not operated, so that a liquid brake pressure which is substantially equal to the liquid brake pressure introduced into the front wheel cylinder which is connected to the master cylinder, namely an input liquid brake pressure $P_{IN}$, is introduced into the rear wheel cylinder, as indicated by a rectilinear curve A in FIG. 4.

When the vehicle is empty, a liquid brake pressure of a relatively low magnitude is sufficient to cause the deceleration of the vehicle to exceed the given value, as indicated at point a in FIG. 4, whereby the ball-shaped valve body 21 rolls to the left, as viewed in FIG. 1, under its own inertia to move away from the valve seat 24. When the liquid brake pressure increases under such condition to a value indicated by point b in FIG. 4, the hydraulic fluid forces the valve body 30 of the valve mechanism 22 to open to permit a fluid flow into the chamber 20 through the passages 17, 23 and thence into the chamber 26 through the clearance formed between the valve body 21 and the valve seat 24 and through the passage 25. As mentioned previously, since part of the chamber 26 is formed in the left-hand end of the plunger portion 6a having an increased diameter, the brake pressure introduced into this chamber urges the plunger to the right against the resilience of the spring 8.

As the liquid brake pressure further increases to a value indicated by a point c in FIG. 4, the bias applied to the plunger 6 to urge it to the right, or the bias applied by the liquid brake pressure introduced into the chamber 26, combined with the bias applied by the liquid brake pressure which acts upon the left-hand end face of the plunger 6, exceeds the sum of the resilience of the spring 8 and the bias applied to the plunger 6 to urge it to the left by the liquid brake pressure introduced into the chamber 16, whereby the plunger 6 moves to the right, allowing the valve body 12 to seat on the valve seat 14. Thereupon, a further increase in the liquid brake pressure which is introduced into the rear wheel cylinder through the opening 10 is prevented.

Subsequently, as the liquid brake pressure further increases, the bias applied to the left-hand end face of the plunger 6 does not increase since the valve body 12 seats on the valve seat 14 while the biases applied by the liquid brake pressure introduced into the chambers 16, 26 continues to increase. Since the surface area of the plunger 6 which is subject to the hydraulic pressure prevailing in the chamber 16 is chosen to be greater than the surface area of the plunger which is subject to the hydraulic pressure prevailing in the chamber 26, the plunger 6 then moves to the left, thus moving the valve body 12 away from the valve seat 14. As a result, the liquid brake pressure acting on the left-hand end face of the plunger 6 and hence supplied to the rear wheel cylinder increases to cause a movement of the plunger 6 to the right, thus causing the valve body 12 to again be seated on the valve seat 14. In this manner, the plunger 6 reciprocates to the left and right as the liquid brake pressure continues to increase, causing the liquid brake pressure $P_{OUT}$ supplied to the rear wheel cylinder to be increased with respect to the input brake pressure $P_{IN}$ at a low increase rate which depends on the difference of the surface areas subject to the respective hydraulic fluids (see rectilinear curve portion B shown in FIG. 4).

In contrast to the braking characteristic of the vehicle when it is empty, when the vehicle is loaded, the deceleration of the vehicle remains at a small value as the liquid brake pressure increases to a value which is sufficient to force the valve body 30 of the mechanism 22 open (see point b in FIG. 4). Hence the valve body 21 is maintained in engagement with the valve seat 24 by gravity. When the valve body 30 is forced open under this condition to permit flow of the liquid brake pressure into the chamber 20, the hydraulic fluid maintains the valve body 21 against the valve seat 24 as a result of a pressure differential between the pressure prevailing in the chamber 20 and the pressure prevailing in the passage 25 and the chamber 26. Consequently, the valve body 21 cannot be moved away from the valve seat 24 even if the liquid brake pressure further increases and causes the deceleration of the vehicle to exceed the given value. Since no liquid brake pressure is introduced into the chamber 26 on the left-hand side of the plunger portion 6a under this condition, the only bias applied to the plunger 6 to cause it to move to the right is obtained by the liquid brake pressure applied to the left-hand end face of the plunger 6. Consequently, the plunger 6 cannot move to the right if the liquid brake pressure increases to point c, in contradistinction to the operation when the vehicle is empty. In this instance, operation of the plunger 6 is avoided if the surface area on the right-hand end of the plunger portion 6a which communicates with the chamber 16 is greater than that on the left-hand end of the plunger 6. Hence, liquid brake pressure which is substantially equal to that produced within the master cylinder can be introduced into the rear wheel cylinder (see rectilinear curve A' shown in FIG. 4). On the other hand, if the relationship of the surface areas mentioned above is designed to be opposite from that mentioned above, the operation of the proportioning valve 1 can be initiated at a liquid brake pressure (see point d shown in FIG. 4) which is greater than the corresponding value effective when the vehicle is empty, by an amount which depends on the magnitude of the difference in the surface areas (see rectilinear curve C shown in FIG. 4). In either instance, a braking characteristic can be obtained which is appropriate when the vehicle is loaded.

Figure 5:
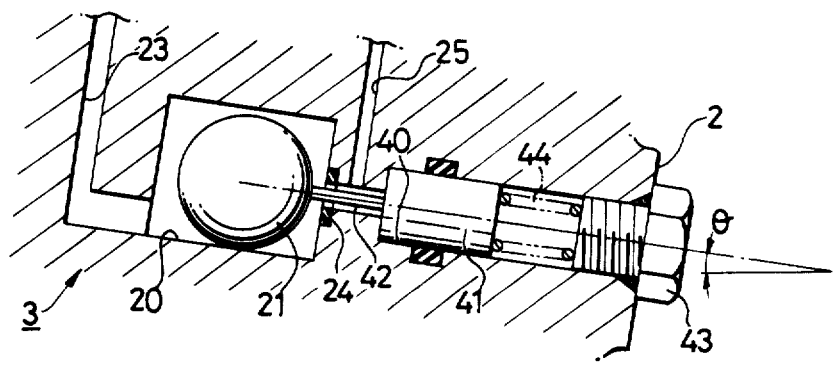
FIG. 5 is a longitudinal section of a deceleration sensing valve according to a further embodiment of the invention.

FIG. 5 shows a liquid pressure sensing valve according to another embodiment of the invention. In this embodiment, the valve mechanism 22 mentioned above is omitted, and instead a piston 41 is slidably fitted in a bore 40 which communicates with the passage 25, with a rod 42 mounted on the piston 41 to thrust the valve body 21 mentioned above. In addition, a spring 44 is interposed between the piston 41 and a plug 43 which blocks the bore so that the valve body 21 is normally prevented from seating on the valve seat 24 by the presence of the rod 42. In other respects, the arrangement is similar to that shown in FIG. 1.

In this embodiment, the liquid brake pressure is immediately introduced into the chamber 20, passage 25 and the chamber 26 through the passage 23 as soon as it is produced, and the pressure acts on the left-hand end face of the piston 41, tending to move it to the right. Consequently, by arranging such that a deceleration of a given value is obtained before the piston 41 moves to the right to thereby allow the valve body 21 to seat on the valve seat 24 when the vehicle is empty, the valve body 21 rolls to the left under its inertia before it seats on the valve seat 24, so that a subsequent movement of the piston 41 to the right cannot allow the valve body 21 to seat on the valve seat 24, thus allowing a similar braking characteristic to be obtained as mentioned in connection with the previous embodiment when the vehicle is empty.

By contrast, when the vehicle is loaded, the liquid brake pressure causes the piston 41 to move to the right to allow the valve body 21 to be seated on the valve seat 24 before the valve body 21 rolls to the left under its inertia, and the subsequent increase in the liquid brake pressure maintains the valve body 21 seated on the valve seat 24, thus allowing the desired braking characteristic to be obtained as in the previous embodiment when the vehicle is loaded.

It will be seen from the above description of the two embodiments that the controlled pressure which is produced in the passage 25 downstream of the deceleration sensing valve 3 of the invention is high and low when the vehicle is empty and loaded, respectively, in a manner opposite to that of the conventional deceleration sensing valve initially mentioned. Thus, the manner of utilizing the controlled pressure is opposite from that of the prior art, but a variety of proportioning valves which are suitable for use with the invention can be easily constructed.

Figure 6:
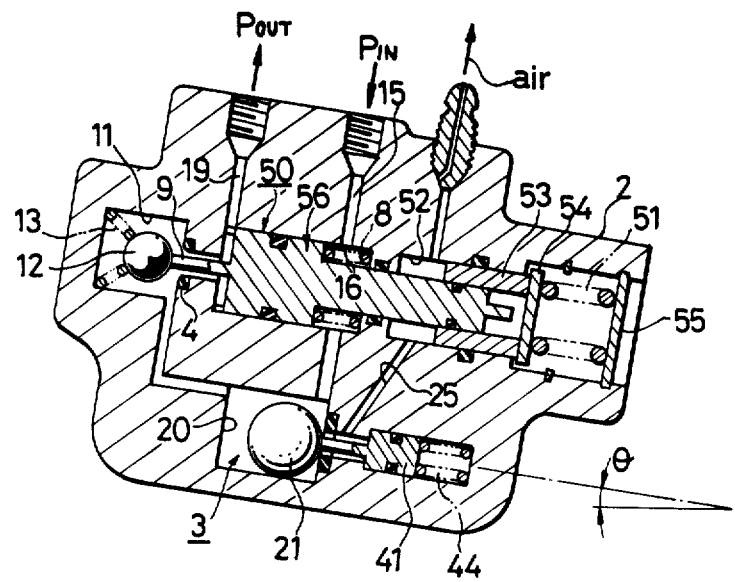
FIGS. 6 and 7 are longitudinal sections of the deceleration sensing valve shown in FIG. 5 combined with proportioning valves of different forms.

FIG. 6 shows proportioning valve 50 in accordance with an additional embodiment which is provided with a second spring 51 so that the resilience of the second spring does not act on the proportioning valve when the vehicle is empty, but acts when the vehicle is loaded, thus allowing different braking characteristics to be obtained when the vehicle is empty and loaded. Specifically, the proportioning valve 50 is constructed essentially in the same manner as the conventional proportioning valve so that it becomes operative whenever the liquid brake pressure exceeds a given value to reduce the rate of increase of the liquid brake pressure to a given value. In FIG. 6, the proportioning valve 50 includes a chamber 52 in which a controlled liquid brake pressure from the deceleration sensing valve 3 is introduced. One end of a piston 53 is disposed in the chamber 52, and the second spring 51 is interposed between a plate 54 fixedly mounted on the other end of the piston 53 and a retainer 55 which is disposed in the casing 2. The plate 54 is located opposite to one end of a plunger 56 which is slidably fitted into a bore formed in the piston 53 to constitute the proportioning valve 50. In other respects, the arrangement is similar to that shown in FIG. 1 except that a deceleration sensing valve shown in FIG. 5 is used and that a communication is maintained between the chambers 16, 11 through the chamber 20 of the deceleration sensing valve, and accordingly corresponding parts are designated by like reference numerals.

In operation, when the vehicle is empty, as a liquid brake pressure of a high magnitude is introduced into the chamber 52, both the piston 53 and the plate 54 move to the right, with the plate 54 located out of interference with the plunger 56. As a consequence, only the resilience of the spring 8 acts on the plunger 56, allowing the proportioning valve 50 to initiate its operation at a low brake pressure. On the other hand, when the vehicle is loaded, a liquid brake pressure of a high magnitude is not introduced into the chamber 52, so that both the piston 53 and the plate 54 remain in their nonoperative positions shown. The proportioning valve 50 tends to initiate its operation at a low brake pressure in a similar manner as when the vehicle is empty, but the right-hand end of the plunger 56 moves into abutment against the plate 54 before the plunger 56 can move an enough stroke to the right to permit the valve body 12 to be seated on the valve seat 14, with the resilience of the second spring 51 acting on the plunger 56. Consequently, the proportioning valve 50 cannot operate at the described low brake pressure, but initiates its operation only when a higher liquid pressure is obtained. Alternatively, the operation of the proportioning valve 50 can be entirely prevented by using a stronger spring for the second spring 51. Accordingly, it will be apparent that the braking characteristic as illustrated in FIG. 4 can be achieved with this form of proportioning valve.

Figure 7:
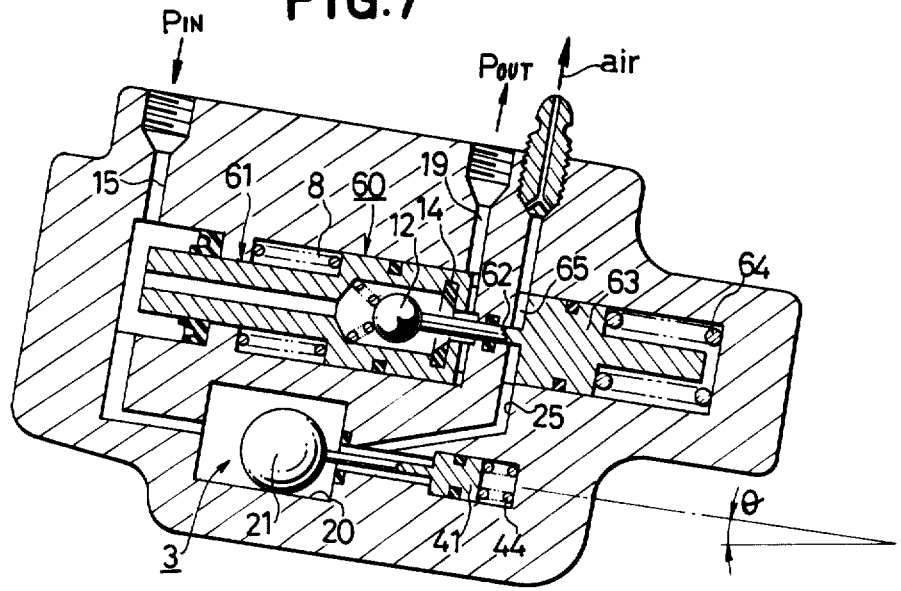

FIG. 7 shows another embodiment of proportioning valve 60 in which the lift of the valve body 12 can be adjusted to attain the different braking characteristics when the vehicle is empty and loaded. Specifically, the proportioning valve 60 shown houses the valve body 12 within a plunger 61 as a deviation from that mentioned previously. However, a proportion valve of such construction is also known in the art. In the conventional proportion valve, a rod 62 which is used to thrust the valve body 12 is fixedly mounted on the casing 2, but in accordance with the invention, the rod 62 is connected to a piston 63 for movement therewith. The piston 63 is urged by a spring 64 in one direction so that the degree of extension of the rod 62 or the lift of the valve body 12 from the valve seat 14 is normally at its maximum. The passage 25 downstream of the deceleration sensing valve 3 is connected in communication with a chamber 65 formed in the left-hand end face of the piston 63. In other respects, the arrangement is similar to that shown in FIG. 1, and corresponding parts are designated by like reference numerals.

With this form of proportioning valve, as a liquid pressure of an increased magnitude is introduced into the chamber 65 when the vehicle is empty, the piston 63 and the rod 62 move to the right to decrease the lift of the valve body 12 while when the vehicle is loaded, the lift of the valve body 12 is maintained at its initial value since the rod 62 does not move to the right. Accordingly, the magnitude of the liquid pressure which is required to move the plunger 61 against the resilience of the spring 68 until the valve body 12 becomes seated on the valve seat 14 is greater when the vehicle is loaded, resulting in the braking characteristics as indicated by rectilinear curves B and C in FIG. 4 to be obtained.

While the invention has been shown and described herein with reference to specific embodiments thereof, it should be understood that the invention is not limited thereto, but a number of modifications, changes and variations can be made therein without departing from the spirit and scope of the invention. Accordingly, it is intended that the invention be limited solely by the appended claims.

What is claimed is:

1. A deceleration-sensing valve assembly for regulating brake fluid pressure in a vehicle movable in a forward direction, comprising:
    housing means defining therein a chamber;
    an inlet passage opening into said chamber for permitting fluid to be supplied thereto;
    an outlet passage which opens into a rear portion of the chamber for permitting the fluid to flow from the chamber into the outlet passage;
    a first normally-closed, inertia-actuated valve mechanism for controlling the flow of fluid from the chamber to the outlet passage, said valve mechanism including a valve body movably disposed within said chamber and engageable with a valve seat positioned rearwardly of the valve body relative to the forward direction of the vehicle, said valve seat being disposed in surrounding relationship to the opening of the outlet passage, said valve body tending to move under its own inertia forwardly away from the valve seat in response to vehicle deceleration of a given value as caused by (1) a first predetermined brake fluid pressure when decelerating an empty vehicle and (2) a second predetermined brake fluid pressure when decelerating a loaded vehicle, said second predetermined pressure being greater than said first predetermined pressure; and
    a second normally-closed valve mechanism associated with said inlet passage for controlling flow of fluid through said inlet passage into said chamber, said second valve mechanism having means associated therewith for permitting opening of said second valve mechanism and flow of fluid through said inlet passage into said chamber only when the fluid in said inlet passage equals or exceeds a third predetermined fluid pressure which is greater than said first predetermined pressure but less than said second predetermined pressure;
    whereby deceleration of an empty vehicle permits said valve body to move away from said valve seat and open said first valve mechanism prior to opening of said second valve mechanism so that the fluid when it exceeds said third predetermined pressure can then flow from the inlet passage through the opened second valve mechanism into the chamber and thence into the outlet passage, whereas when decelerating a loaded vehicle the valve body remains seated against the valve seat even after the second valve mechanism opens so that the fluid within the chamber then also acts against the valve body and assists in holding it against the valve seat even if the fluid exceeds said second predetermined pressure.

2. An assembly according to claim 1, wherein the chamber includes a bottom wall which is sloped upwardly at a small angle relative to the horizontal as it projects forwardly away from the valve seat so that the valve body is normally gravity-urged against the valve seat, said valve body being movably supported on said sloped bottom wall and capable of moving upwardly therealong away from said valve seat in response to vehicle deceleration of said given value.

3. An assembly according to claim 2, wherein said valve body is in the form of a ball.

4. An assembly according to claim 1, including a third normally-closed, one-way valve mechanism associated with said inlet passage for permitting flow therethrough from the chamber back into the inlet passage when the pressure on the chamber side of said third valve mechanism exceeds the pressure on the other side thereof, said third valve mechanism being connected in parallel with said second valve mechanism.

5. An assembly according to claim 4, wherein said second valve mechanism includes a spring-urged valve member normally maintained in seating engagement with a valve seat disposed in surrounding relationship to said inlet passage for permitting opening of said second valve mechanism and flow therethrough from said inlet passage into said chamber only when said fluid pressure equals or exceeds said second predetermined pressure, said valve member comprising a disk-like member, said third valve mechanism including an elastically flexible member disposed so as to extend over one of the faces of said disk-like valve member, said third valve mechanism also including a first opening extending through said disk-like valve member and communicating with the face thereof, said first opening being normally closed by said elastically flexible member, and a second opening extending through said elastically flexible member but being disposed in nonaligned relationship with said first opening.

6. An assembly according to claim 4, wherein said inlet passage includes parallel branch paths formed therein, and said second and third valve mechanisms respectively comprising first and second normally-closed, one-way check valves disposed respectively in said first and second paths, the first and second check valves permitting flow in opposite directions with respect to one another.

7. In a deceleration-sensing valve assembly for regulating the brake pressure fluid of a vehicle movable in a forward direction, said assembly including housing means adapted to be mounted on the vehicle, an inlet passage in said housing means terminating in an inlet port which is adapted to be connected to the brake master cylinder of the vehicle, an outlet passage in said housing means terminating in an outlet port adapted to be connected to one of the vehicle wheel brakes, proportioning valve means movably supported on the housing means for regulating the flow of brake pressure fluid from the inlet passage to the outlet passage, a control passage means connected between said inlet passage and said proportioning valve means for controlling the movement thereof, and vehicle deceleration-sensing valve means associated with said control passage for regulating the flow therethrough to said proportioning valve means, the improvement comprising:

said control passage means including an intermediate chamber, a first passage providing communication between said inlet passage and said chamber, and a second passage providing communication between said chamber and said proportioning valve means;

said deceleration-sensing valve means including an inertia-sensitive valve body movably positioned within said chamber and positioned for seating engagement with a valve seat disposed in surrounding relationship to said second passage, said valve body being normally gravity-urged toward a position of seating engagement with the valve seat, said valve body when seated with said valve seat preventing flow of fluid from said chamber into said second passage, said valve seat being positioned rearwardly of said valve body relative to the forward direction of the vehicle, said valve body tending to move forwardly away from said valve seat due to the inertia of said valve body in response to deceleration of said vehicle of a given value which corresponds to a first predetermined brake fluid pressure when decelerating an empty vehicle and which corresponds to a second predetermined brake fluid pressure when decelerating a loaded vehicle, said second predetermined pressure being greater than said first predetermined pressure; and a normally-closed valve mechanism associated with said first passage for permitting flow of brake fluid therethrough into said chamber only when said brake fluid equals or exceeds a third predetermined fluid pressure which is greater than said first but less than said second predetermined pressure.

8. An assembly according to claim 7, wherein said inlet and outlet passages communicate with one another through an intermediate connecting passage, said proportioning valve means including a valve member movable between open and closed positions for controlling flow of fluid through said connecting passage, said proportioning valve means also including a plunger movably supported on said housing and normally maintained in a nonoperative position wherein it is interconnected with said valve member for maintaining it in its open position, said plunger defining thereon a pressure face which communicates with a fluid-receiving region which in turn communicates with said second passage, whereby pressure fluid supplied through said second passage into said region acts against said plunger and moves same away from said nonoperative position so as to permit said valve member to be moved into said closed position.

9. An assembly according to claim 8, wherein said plunger has a second pressure face thereon which faces in the opposite direction from said first-mentioned pressure face and at least partially defines a second region which communicates with said inlet passage, said plunger being urged backwardly toward said nonoperative position by the increase in the pressure level of the fluid within said second region when the valve member is in its closed position.

10. An assembly according to claim 7, wherein said chamber includes a bottom wall which is sloped upwardly at a small angle relative to the horizontal as it projects forwardly away from the valve seat, said valve body comprising a ball which is rollingly supported on the sloped bottom wall and is normally gravity-urged toward the valve seat.

11. An assembly according to claim 7, including normally-closed, one-way check valve means associated with said control passage means and connected in parallel with said deceleration-sensing valve means, said check valve means permitting return flow therethrough from said chamber through said first passage.

* * * * *